W. C. HICKS.
Sewing-Machines.
No. 5,305. Reissued-March 4, 1873.
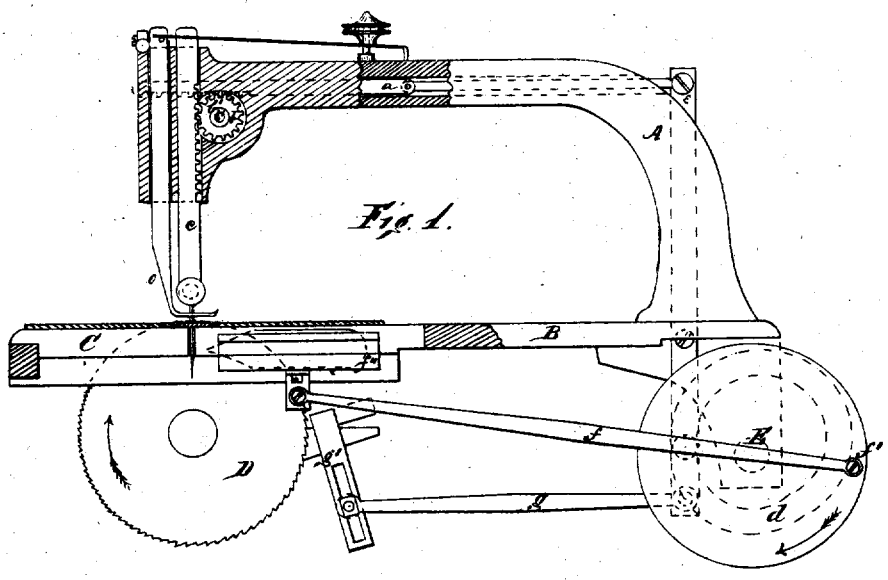
Fig. II
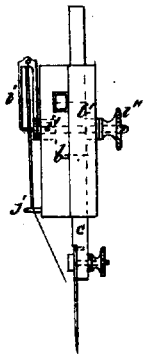
Fig. IV.
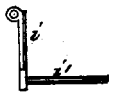
Fig. V.
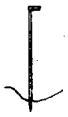
Fig. III.
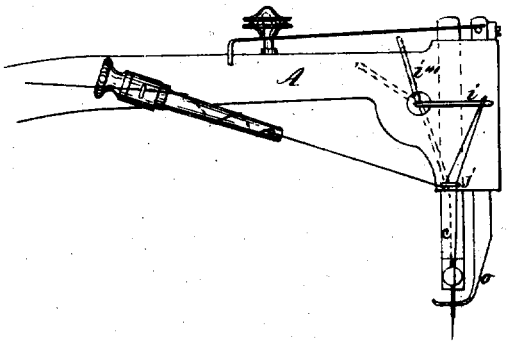
Witnesses.
W. L. Bemen
Louis Searrard
Inventor
Wm Cleveland Hicks
AM. PHOTO-LITHOGRAPHIC CO. N.Y. (OSBORNE'S PROCESS.)

UNITED STATES PATENT OFFICE.

WILLIAM CLEVELAND HICKS, OF SUMMIT, NEW JERSEY.

IMPROVEMENT IN SEWING-MACHINES.

Specification forming part of Letters Patent No. 23,557, dated April 12, 1859; reissue No. 5,305, dated March 4, 1873.

*To all whom it may concern:*

Be it known that I, WILLIAM CLEVELAND HICKS, of Summit, county of Union and State of New Jersey, and formerly of Boston, county of Suffolk and State of Massachusetts, have invented certain new and useful Improvements in Sewing-Machines; and I do hereby declare that the following is a full, clear, and exact description and specification of the same, reference being had to the annexed drawing making part of this specification, similar letters indicating similar parts in all the figures.

My improvement consists in certain combinations and arrangements of mechanical devices specifically set forth at the end of this schedule.

The general character of the machine which I shall employ in describing my various improvements is that of a shuttle machine, having a needle reciprocating vertically, a roughened surface wheel-feed, and reciprocating shuttle. The bracket-arm which supports the needle-stock and spring-presser for the upper part of the feed is seen at A. The table for supporting the material to be sewed, and to which also all the mechanism is attached, is shown at B; the shuttle-race, at C; the feed-wheel, at D; and the main driving-shaft, at E. The position of the bracket-arm A is in a line parallel with the shuttle-race, instead of standing at right angles to it. The feed-wheel D is placed so as to direct the cloth in a line toward the upright column or post supporting A, and into the bight of the overhanging bracket. The main or driving shaft is placed under the post of the bracket A, and under the table or at right angles with the overhanging part of the said bracket. The object of this arrangement is to be enabled to transmit the motions from the cams, cranks, &c., upon E, for driving the wheel-feed and shuttle by means of connecting-rods which shall have their motions all given them in planes parallel with the shuttle-race and bracket-arm. Thus the table B might be lengthened out to any other distance, and the feed-wheel and shuttle removed for a like distance in the same line of direction, and be operated from the main-shaft by increasing the lengths of the connecting-rods. The means I have adopted for transmitting the motions to the needle-bar have the like property. The bracket-arm A is shown as being hollow; through this a connecting-rod passes and transmits the motions from the cam or crank on the driving-shaft to the needle-stock. This rod is seen at *a*, traversing the entire length of the arm. It moves the needle-stock by having rack-teeth cut upon its under side, as shown; these engage a pinion-wheel, *b*, and this again is engaged or geared with the needle-stock *c* by means of like rack-teeth, as shown. Reciprocating motion is given to the connecting-rod *a* by means of a cam, shown in dotted lines at *d*, acting through a lever, *e*, as shown. The exact motions given by the cam at all points of its revolution are thus imparted to the needle-stock. Instead of a cam a crank may be substituted. The shuttle is driven by a connecting-rod, *f*, extending from the crank-pin *f'* on the main shaft to the yoke *f''*, by which the shuttle is embraced. The feed is driven by a connecting-rod, *g'*, one end of which is attached to the bottom of the lever *e*, and the other to the rocking lever *g''*, by which the griping-toe on the feed-wheel is moved.

It will now be seen that the table may be lengthened out to any required distance, and the needle, feed apparatus, and shuttle be moved accordingly to the distant end of said table, while the driving-shaft remains at the opposite end, without requiring any new adjustment or alteration of parts other than the lengthening of the bracket-arm and the several links *a*, *f*, and *g*.

The device for controlling and drawing up the needle-thread is seen at *i* in Figs. II and III, and shown in a modified form detached in Fig. IV. It consists of a lever or crank, having an eye in its end through which the thread passes on its way from the tension apparatus to the needle. The axis *i'* of this crank passes through the center of the axis *b'* of the pinion *b*, and is made to turn with the pinion by means of a clamping-nut, *i''*, on the end of *i'*, which, when screwed up, sets against the end of the axis *b'*, and thus the two are joined together by friction. The object of thus attaching the two is for the purpose of adjusting the crank to its proper position for giving off and taking up the thread.

As the pinion *b* does not make a complete revolution, so the eye in the end of the crank *i* describes an arc of corresponding extent; and it is convenient to be able to adjust the end of the crank or lever containing the eye in reference to the guiding-eye *j* on the head of the bracket arm, so that the needle-thread may be directed toward the needle, and that the tightening and loosing of the thread may be properly effected to form a strong and even seam.

At *j*, Figs. II and III, is shown this guiding-eye for the thread to pass through on its way from the tension apparatus to the controlling crank, and thence to the needle; thus it will be seen that the vibration of *i* toward *j* allows the thread to be slackened; so in the reverse motion, it is taken up and tightened without passing through the needle-stock and entirely independent of its motion.

In former machines the needle-stock has been either the direct agent for drawing up the needle-thread and making the slack necessary to allow the shuttle to pass through, having some attachment to control the thread between the needle-stock and the needle-eye; or the needle-stock has been the indirect agent, operating an independent lever or spring-arm through an eye in which the thread has been passed, the labor of working this lever being performed by the needle-stock. Another method has been used, which consists in operating certain wires, combined with a tension apparatus, by a shaft and cam above the sewing-table, in lines nearly parallel to the table and bracket-arm, and at a distance from the needle-stock.

My apparatus is not actuated by the needle-stock, nor does the thread pass through the needle-stock, and the eye in the end of the crank or lever is located nearly over the presser-foot, making its stroke in a plane parallel or nearly so with a plane passing longitudinally through the bracket-arm and shuttle-race, is pivoted to the bracket-arm at a point in the rear of the needle bar or stock, and is operated by a cam on a shaft under the table, so that the needle-stock is entirely relieved of the labor of actuating the thread-controlling mechanism. In the machine shown in the drawing, the thread must be fully drawn up before the needle has finished its up-stroke, and the crank is set so that the eye in its end shall be at its greatest distance from the eye *j* when the shuttle reaches the extreme of its stroke, in order to draw the two threads into the center of the cloth, and the needle-thread is either held tight during the continued movement of the needle-stock, or is allowed to slacken. If the latter is desirable, the form shown in Fig. IV may be used. This slight slackening up is important in sewing some kinds of materials.

The operation of my machine is as follows: The materials being placed on the fore part of the table, are advanced under the spring presser-foot *o* to the place where the sewing is to commence. This foot is then let down to clamp the work upon the roughened surface beneath, in the usual manner. The main or driving shaft E is now started, thus communicating motion to the several parts. As the needle is at its up-stroke when the cloth is inserted, the first action from the cam *d* will be to push the connecting-rod *a*. This, by its rack, turns the pinion *b*, and this again drives down the needle-stock *c*, thus sending the needle through the cloth. The thread-controller and take-up crank *i* is also turned down, and thus throws down the slack thread ready for allowing the shuttle to pass through. The respective positions of the parts will then be as shown in Fig. I. The crank-pin *f'*, from which the shuttle is driven, is seen to be on its center. As E turns in the direction of the arrow, the shuttle will commence to move forward by its connecting-rod *f'*, pushing the yoke *f''*; the point will thus enter the loop thrown out by the slight retreat of the needle; then passing through in the usual way, the cam *d* commences to draw up the needle-stock by reversing the motion of *a*. As the crank *f* approaches its opposite center, the motion of the shuttle becomes gradually slower up to the dead-point of the crank. The cam *d* is so set and shaped as to cause the needle to begin to be moved a little before the shuttle has arrived at the end of its stroke, and to complete its movement a little after the commencement of its return; thus there is only time allowed for drawing up the thread and returning the shuttle. The slack thread is taken up as the needle rises, and it arrives at its maximum height before the needle has completed its ascent, in order that the thread may be drawn up tight while the shuttle is at the end of its stroke, and is, for the instant, stationary. The pinch-nut *i''* may be loosened, and the take-up *i* moved around until the adjustment is accomplished.

The shuttle being driven by a crank motion and the upper thread drawn up by a like motion, produces a very superior tension, and always insures the drawing up of the stitch so that the lock will be in the center of the materials being sewed.

It will be seen that both threads are drawn up by positive motions when the shuttle and controller have their slowest motions, and just previous to their strokes being finished; and hence the threads are not liable to be broken by the highest speed at which the machine is capable of being run. The other parts of the machine are as common to sewing-machines.

Having thus fully described my invention, what I claim, and desire to secure by Letters Patent, is—

1. The combination, substantially as herein set forth, of a flat-shuttle sewing-machine table, provided with a shuttle-driver or raceway running substantially parallel with its upper surface; a bracket-arm, attached by its post to one end of said table, and extending substantially parallel with said shuttle-race to support the needle-stock and mechanism, substantially as set forth, for giving said needle-stock a vertical reciprocating motion by means of a cam or crank on the driving-shaft; a shaft arranged at right angles to said shuttle-race, in a bearing or bearings attached to the platform of the table, provided with a cam or crank which operates the feed, and with a crank which reciprocates the shuttle once forward and back at each revolution, by a continuous and positive crank motion, both located under the table and under the post of the bracket-arm; a wheel-feed or other feeding mechanism under the table; and a shuttle-driver, all arranged in such manner that the direction in which the materials to be sewed shall be fed and sewed shall be in a line parallel with said bracket-arm, and toward and into the bight formed by the said arm and the table.

2. The arrangement, substantially as herein set forth, of a partially revolving thread-controlling crank or lever, on a stud set at right angles to the bracket-arm, above and parallel with the table, and connected, substantially as described, with a cam or crank on the main shaft under the table, in such manner that the needle-thread is entirely controlled and drawn up between the tension apparatus and the needle by said lever, actuated by the movements of said cam or crank without the intervention of the needle-stock.

3. The combination, substantially as herein set forth, of the needle-stock, bracket-arm, pinion, connecting rod and lever, with the driving-shaft, in such manner that the motions of the cam or crank on said shaft may be transmitted to the pinion and needle-stock, substantially as herein set forth.

4. The combination, substantially as set forth, in a shuttle sewing-machine, of a table provided with a shuttle race or way running parallel to its upper surface, and with a bracket-arm, fastened by its post at one end of said table, lying substantially parallel with said shuttle-race or way, to support a vertically-reciprocating needle-stock; and a shaft located (in a bearing or bearings attached to the platform of a table) at right angles to the shuttle race or way, and bracket-arm provided with cams or cranks under the table, and under the post of the bracket-arm, for actuating the shuttle and feed, by means of connecting-rods, reciprocating in the direction of their length, substantially as set forth; and connected, through the post of the bracket-arm, to a rod or bar running longitudinally through the bracket-arm, to actuate the mechanism which reciprocates the needle-stock, substantially as set forth, so that the table, the bracket-arm, and the connecting rods or bars, may be lengthened in the same direction, without changing the cams or cranks which actuate the needle-stock and shuttle, or their combined motions in reference to each other, substantially as set forth.

WM. CLEVELAND HICKS.

Witnesses:
W. L. BENNEM,
LOUIS SEAMAN.